May 23, 1967  L. M. FORBUSH  3,321,199
LEAF SPRING FLUTTER DAMPER
Filed June 3, 1965
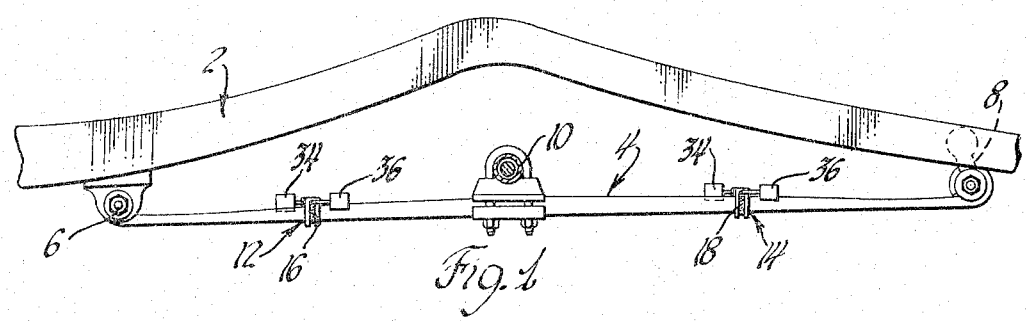
Fig. 1
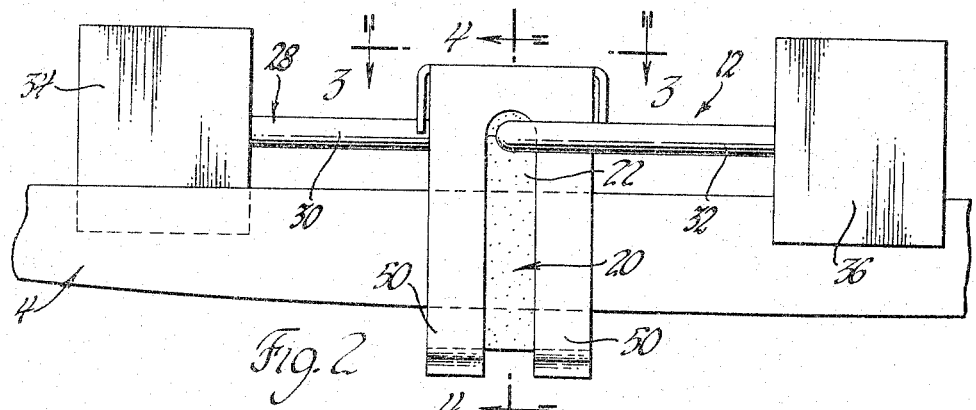
Fig. 2
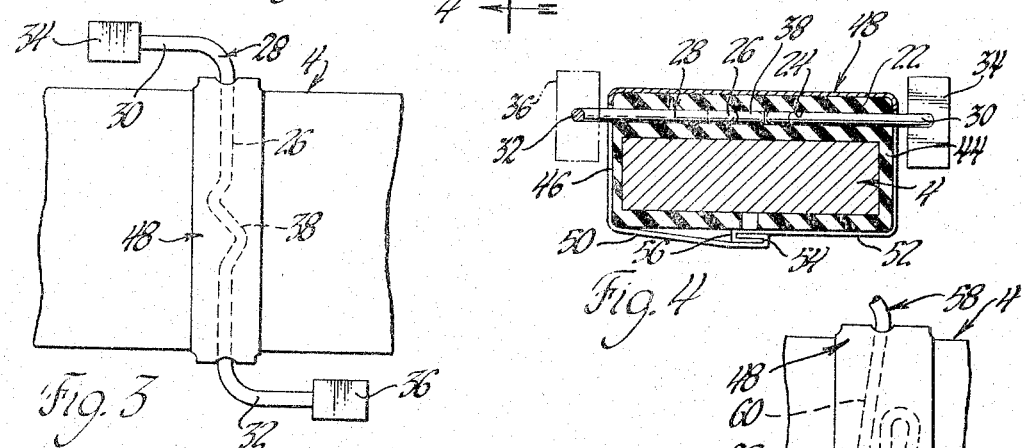
Fig. 3
Fig. 4
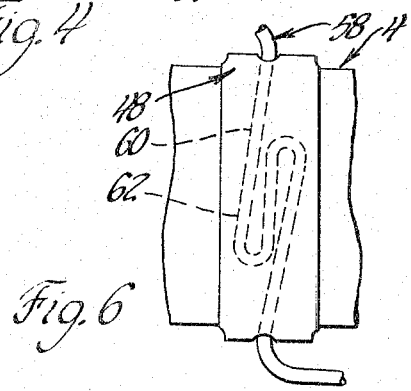
Fig. 6
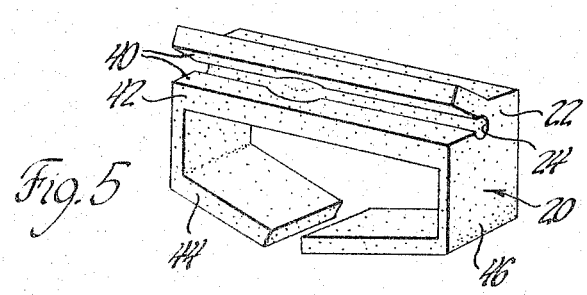
Fig. 5
INVENTOR.
Lothrop M. Forbush
BY
W. F. Wagner
ATTORNEY

United States Patent Office 3,321,199
Patented May 23, 1967

3,321,199
LEAF SPRING FLUTTER DAMPER
Lothrop M. Forbush, Birmingham, Mich., assignor to General Motors Corporation, Detroit, Mich., a corporation of Delaware
Filed June 3, 1965, Ser. No. 460,914
9 Claims. (Cl. 267—36)

This invention relates to vehicle suspension and more particularly to damper means for improving the performance of the leaf spring suspension.

An object of the invention is to provide an improved vehicle suspension system.

A further object is to provide an improved leaf spring suspension.

Another object is to provide means for damping undesirable vibration of leaf spring suspension.

A still further object is to provide a simple, economical and efficient tuned vibration damper especially adapted for leaf spring suspension.

According to the general features of the invention, a conventional leaf spring suspension is provided with a simple arrangement of masses, a torsion spring, and mounting means therefor, providing a tuned damper acting on the anti-node of the leaf spring. The masses or weights are arranged relative to the torsion spring so that the natural frequency thereof corresponds to the natural frequency of the undesirable flutter mode of vibration of the leaf spring but 180° out of phase therewith.

These and other objects, advantages and features of the invention will become more readily apparent as reference is had to the accompanying specification and drawing wherein:

FIGURE 1 is a fragmentary view, partially in section, of a vehicle suspension construction embodying the invention;

FIGURE 2 is a greatly enlarged view of a damper construction in accordance with the invention;

FIGURE 3 is a view looking in the direction of arrows 3—3 of FIGURE 2;

FIGURE 4 is a view looking in the direction of arrows 4—4 of FIGURE 2;

FIGURE 5 is a perspective view of the elastic mount shown in the foregoing figures; and FIGURE 6 is a view similar to FIGURE 3 illustrating a modified form of the invention.

Referring now to the drawing and particularly FIGURE 1, there is shown a fragmentary portion of a vehicle chassis in which the reference numeral 2 generally designates a frame side rail having disposed therebeneath a longitudinally extending leaf spring 4. At its forward end, spring 4 is secured to side rail 2 by a pivot connection 6 while its rearward end is connected to frame 2 by a shackle assembly 8. Clamped to spring 4 between the forward and rearward ends thereof is a transversely extending axle 10. It will be understood that axle 10 rotatably supports road wheels, not shown, so that the frame 2 is elastically supported above the ground in the conventional manner. In suspension constructions of the general type thus far described, it is known that elastic deformation of the spring incident to normal wheel deflection tends to excite "flutter" in portions of the spring between the axle mounting and each end of the spring which may produce undesirable vibration throughout the vehicle. It is also known that maximum flutter amplitude occurs at the anti-node of the spring which in the case illustrated occurs at two locations: one approximately half way between the axle mounting and the pivot connection 6, and the other approximately half way between the axle mounting and the shackle assembly 8.

In accordance with the general features of the invention, in order to eliminate offending spring flutter, a pair of identical tuned damper assemblies 12 and 14, respectively, are secured to the spring 4 at the anti-nodes 16 and 18 thereof.

According to the principal feature of the invention, as seen best in FIGURES 2, 3 and 4, the damper assembly 12 comprises an elastic body 20 arranged in transversely encircling relation with the spring 4, which elastic body is formed with an upper portion 22 having a transverse passage 24 formed therein through which extends the central torsionally active portion 26 of a torsion spring member 28. Spring 28 includes integral oppositely bent end portions 30 and 32 which lie in parallel relation with the vertical longitudinal midplane of spring 4. At their extremities, end portions 30 and 32 have affixed thereto a pair of corresponding weights or masses 34 and 36. Approximately centrally thereof, the transverse portion of spring 28 is formed with a serpentine bend 38 which lies in the plane of bent end portions 30 and 32 and functions to orient the portion 26 angularly so that end portions 30 and 32 normally lie in a common plane generally parallel with the horizontal plane of the leaf spring. In operation, upon excitation of offending flutter mode of vibration in the leaf spring, the weights 34 and 36 oppose each other in inducing torsional wind-up of spring 28 while producing a counterforce which dampens the leaf spring flutter.

According to another feature of the invention, in order to render the damper assemblies 12 and 14 most susceptible to economical manufacture, assembly and disassembly, the upper portion 22 of elastic mount 20 is formed with a slit opening 40 extending from the forward face 42 thereof to the passage 24 which enables the central portion 26 of torsion spring 28 to be readily inserted or removed therefrom. As seen best in FIGURES 4 and 5, elastic body 20 also includes integral strip portions 44 and 46 which surroundingly embrace the sides and bottom surface of spring 4. After spring 26 has been inserted in passage 24, as previously noted, the entire elastic mount 20 is secured in embracing relation with the spring 4 by a formed metal jacket 48 which includes forked wrap-around tabs 50 and 52 which straddle the transverse portion 26 of spring 28 adjacent the side edges of mount 20. At their terminal ends, tabs 50 and 52 are provided with clasp portions 54 and 56 which when connected and clinched in cooperating relation exert sufficient deformation force on the elastic body to assure positive retention thereof in the desired location on spring 4.

In FIGURE 6 there is shown a modified form of the torsion spring 58 in which the central portion 60 thereof is formed with a re-entrantly folded loop configuration 62 which functions in the same manner as the serpentine bend 38 of spring 28 but provides greater damping between the spring and the elastic mount 20.

While two embodiments of the invention have been shown and described, it will be apparent that other changes and modifications may be made therein. It is, therefore, to be understood that it is not intended to limit the invention to the embodiments shown, but only by the scope of the claims which follow.

I claim:

1. In a motor vehicle, the combination of a sprung mass, a leaf spring pivotally connected at its opposite ends to said sprung mass, an axle extending beneath said sprung mass and connected to said spring between said opposite ends, and torsionally active tuned damper means mounted on said leaf spring at the anti-node thereof.

2. In a device of the class described, a vibratory leaf spring having an elastic body secured thereon at the anti-node thereof, said body having a torsion spring extending therethrough transversely of the plane of vibration of said leaf spring, and a pair of weights arranged at opposite ends of said torsion spring operative to impart equal and opposite torsional deflection thereto responsive to vibratory deflection of said leaf spring.

3. In a device of the class described, a vibratory leaf spring having an elastic body encircling the anti-node thereof, said body having a torsion spring extending therethrough transversely of the plane of vibration of said leaf spring, and a pair of weights arranged at opposite ends of said torsion spring operative to impart equal and opposite torsional deflection thereto responsive to vibratory deflection of said leaf spring.

4. In a device of the class described, a vibratory leaf spring having an elastic body encircling the anti-node thereof, said body having a torsion spring extending therethrough transversely of the plane of vibration of said leaf spring, and a pair of weights arranged at opposite ends of said torsion spring in mass offset relation to the axis thereof operative to impart equal and opposite torsional deflection thereto responsive to vibratory deflection of said leaf spring.

5. In a device of the class described, a vibratory leaf spring having an elastic body mounted thereon at the anti-node thereof, said body having a torsion spring extending therethrough transversely to the plane of vibration of said leaf spring, said torsion spring having oppositely bent end portions extending parallel to the side edges of said leaf spring, and a pair of equal weights connected respectively at the extremities of said bent end portions.

6. The structure set forth in claim 5 wherein said elastic body includes an upper block portion overlying said leaf spring and lower ear portions integral with said block portion and underlying said leaf spring.

7. The structure set forth in claim 6 wherein said elastic body is compressively deformed against said leaf spring by a formed metal retainer arranged in surrounding clasping engagement.

8. The structure set forth in claim 7 wherein the portion of said torsion spring extending through said elastic body includes a central bend reacting against said elastic body responsive to torsional deflection of said spring.

9. The structure set forth in claim 7 wherein said central bend is angularly oriented so that said bent ends normally lie in a plane normal to the direction of deflection of said leaf spring.

No references cited.

ARTHUR L. LA POINT, *Primary Examiner.*

R. M. WOHLFARTH, *Assistant Examiner.*